(12) United States Patent
Bux et al.

(10) Patent No.: US 9,655,375 B2
(45) Date of Patent: May 23, 2017

(54) PROCESS FOR LIQUEFYING CEREAL PROTEINS

(75) Inventors: Walter Josephina Leo Bux, Antwerp (BE); Nicole S. J. De Cock, Vilvoorde (BE)

(73) Assignee: CARGILL INCORPORATED, Wayzata, MN (US)

( * ) Notice: Subject to any disclaimer, the term of this patent is extended or adjusted under 35 U.S.C. 154(b) by 0 days.

(21) Appl. No.: 13/991,753

(22) PCT Filed: Dec. 5, 2011

(86) PCT No.: PCT/EP2011/006099
§ 371 (c)(1),
(2), (4) Date: Jun. 5, 2013

(87) PCT Pub. No.: WO2012/076149
PCT Pub. Date: Jun. 14, 2012

(65) Prior Publication Data
US 2013/0273205 A1 Oct. 17, 2013

(30) Foreign Application Priority Data
Dec. 6, 2010 (EP) .................................. 10193859

(51) Int. Cl.
| | |
|---|---|
| *A23J 3/18* | (2006.01) |
| *A23J 3/34* | (2006.01) |
| *A23K 20/147* | (2016.01) |
| *A23K 20/142* | (2016.01) |
| *A23K 50/10* | (2016.01) |
| *A23K 50/30* | (2016.01) |
| *A23K 50/80* | (2016.01) |
| *A23K 50/60* | (2016.01) |
| *A23L 33/18* | (2016.01) |

(52) U.S. Cl.
CPC ................. *A23J 3/18* (2013.01); *A23J 3/346* (2013.01); *A23K 20/142* (2016.05); *A23K 20/147* (2016.05); *A23K 50/10* (2016.05); *A23K 50/30* (2016.05); *A23K 50/60* (2016.05); *A23K 50/80* (2016.05); *A23L 33/18* (2016.08); *A23V 2002/00* (2013.01)

(58) Field of Classification Search
CPC ...... A23J 3/14; A23J 1/12; A23J 1/125; A23J 3/18; A23J 3/34; A23J 3/346; A23L 1/3053; A23L 1/034; C12P 21/06; A21D 2/265; A21D 2/268; A23V 2250/5486; A23V 2300/26
USPC ............ 426/52, 612, 63, 656; 435/68.1, 219
See application file for complete search history.

(56) References Cited

U.S. PATENT DOCUMENTS

| | | | |
|---|---|---|---|
| 5,865,535 A | * | 2/1999 | Edwards ..................... 366/76.7 |
| 5,962,254 A | * | 10/1999 | Saniez et al. ................ 435/68.1 |
| 6,555,336 B1 | | 4/2003 | Neumuller |
| 2004/0152881 A1 | | 8/2004 | Holtzapple et al. |
| 2006/0069244 A1 | * | 3/2006 | Holtzapple et al. .......... 530/412 |

FOREIGN PATENT DOCUMENTS

| | | |
|---|---|---|
| EP | 0363771 A2 | 4/1990 |
| EP | 1969950 A1 | 9/2008 |
| JP | 57-186485 A | 11/1982 |
| JP | S63-216438 A | 9/1988 |
| RU | 2202606 | 4/2003 |
| WO | 0201963 A2 | 1/2002 |
| WO | WO02/100186 | 12/2002 |
| WO | 2005/060757 A1 | 7/2005 |
| WO | WO2012/076149 A1 | 6/2012 |

OTHER PUBLICATIONS

Hamada, J. S. et al. J. Food Sci. 53: 1132-1134 (1988).*
Linares, E. et al. J. Food Eng. 48: 127-135 (2001).*
European Search Report of counterpart application No. 10193859, Feb. 25, 2011. 1 page.
PCT International Search Report, PCT/EP11/006099, mailed Jan. 25, 2012, 2 pages.

* cited by examiner

*Primary Examiner* — Hamid R Badr

(57) ABSTRACT

The present invention relates to a process for liquefying cereal proteins. A process for making hydrolysed cereal protein is also disclosed. A composition comprising hydrolysed cereal proteins obtained by the process of the present invention and its uses in food and feed applications are also disclosed. Particularly, the use of a composition comprising hydrolysed wheat proteins as partial or total replacement of animal protein in calf milk is disclosed.

16 Claims, 2 Drawing Sheets

Figure 1 : Vital Wheat gluten coming out of a conventional wheat starch-gluten separation process

Figure 2 : Liquefied vital wheat gluten

PROCESS FOR LIQUEFYING CEREAL PROTEINS

CROSS REFERENCE TO RELATED APPLICATIONS

This application is a national phase application of international application PCT/EP2011/006099, filed Dec. 5, 2011, which application claims priority to European Application 10193859.5, filed Dec. 6, 2010, which applications are hereby incorporated by reference herein in their entirety.

FIELD OF THE INVENTION

The present invention relates to a process for liquefying cereal proteins, in particular for liquefying wheat proteins. The present invention further relates to a process for making hydrolysed cereal proteins, in particular for making hydrolysed wheat proteins. A composition comprising the hydrolysed cereal proteins obtainable by the process of the present invention and uses thereof are also disclosed.

BACKGROUND OF THE INVENTION

Hydrolysed cereal proteins have a high commercial value. They are used in a wide variety of food products, feed products, cosmetics and industrial applications such as for example glues or paints.

Hydrolysed cereal proteins can be produced through acid hydrolysis, for example as described in EP 0 363 771, or through enzymatic hydrolysis.

The enzymatic hydrolysis may be done by adding enzymes to a protein containing substrate in aqueous suspension and by incubating this blend, for example as described in WO 02/32232.

Enzymatic hydrolysis may also be done in a two steps process: a liquefaction step to liquefy the incoming protein material and an incubation step where the actual hydrolysis is taking place. Both steps of the process typically comprise a continuous back mixing. In both steps back mixing is a disadvantage.

In the liquefaction step, as a result of the back mixing, part of the incoming proteins is constantly recycled and remains in the liquefaction step for a longer period of time than desired. Other incoming protein material leaves the liquefaction step too early as they by-pass the back mixing. This material arrives in a non-liquefied state in the incubation step.

In the incubation step, as a result of the back mixing, some material is constantly recycled and is incubated for a longer period of time than desired, resulting in highly hydrolysed proteins, having a low to very low molecular weight. Other material leaves the incubation step too early and is therefore poorly hydrolysed.

Thus existing hydrolysis processes have the disadvantage that the end product (the hydrolysate) does not contain hydrolysed proteins which have been equally hydrolysed, especially when the starting material has visco-elastic properties and forms lumps when hydrated, such as vital wheat gluten. Next to hydrolysed proteins having the desired molecular weight, the hydrolysate typically contains poorly hydrolysed or non hydrolysed proteins having a high molecular weight, and highly hydrolysed proteins having a low to very low molecular weight, such as amino acids.

The low molecular weight fraction of the hydrolysate can confer a bitter taste to the hydrolysate, which is undesirable for food and feed applications. The high molecular weight fraction is often responsible for phase separation (for example due to sedimentation) when the hydrolysate is brought into suspension. This is not desirable, especially when the hydrolysate is used to make products which need to mimic the behaviour of milk-like emulsions.

The hydrolysis of proteins having visco-elastic properties is very difficult due to lump formation upon hydration. So far, lump formation can only be avoided by adding dried vital wheat gluten in solutions comprising for example processing aids.

Another disadvantage of the existing processes is that usually high processing volumes and times are required.

There is thus need for an improved process for producing hydrolysed cereal proteins wherein the proteins have been hydrolyzed to a same degree of hydrolysis and therefore do not have above mentioned disadvantages.

SUMMARY OF THE INVENTION

A first aspect of the present invention relates to a process for liquefying cereal proteins. This process is a liquefaction process and comprises the steps of:
a) Providing a composition comprising one or more cereal proteins, said composition having a dry substance of from 5 to 40% by weight (% w/w) of the composition; then
b) Adding one or more hydrolytic enzymes and/or processing aids to the composition; then
c) Optionally pre-conditioning the composition; then
d) Homogenizing the composition.

A second aspect of the present invention relates to a process for making hydrolysed cereal protein. This process is a hydrolysis process and comprises the steps of:
i) Liquefying a composition comprising one or more cereal proteins according to the liquefaction process as described hereinbefore; then
ii) Optionally pre-treating the composition; then
iii) Incubating the composition at a temperature of from 50 to 85° C. for at least 5 minutes.

A third aspect of the present invention relates to a hydrolysed cereal protein obtainable by the hydrolysis process of the present invention.

A fourth aspect of the present invention relates to a food or feed composition comprising the hydrolysed cereal protein of the present invention and further ingredients to make food or feed compositions. The composition can be in different forms such as powder, paste, liquid. In one embodiment, the composition of the present invention is pressed in the form of a pellet.

A fifth aspect of the present invention relates to the use of the composition according to the present invention in food and feed applications. Preferably, the composition of the present invention is used to partially or totally replace animal proteins in food and feed applications. Most preferably, the composition of the present invention is used to partially or totally replace milk proteins in formulations that are used as calf milk replacer.

BRIEF DESCRIPTION OF THE FIGURES

FIG. 1: picture of vital wheat gluten coming out of a conventional wheat starch-gluten separation process FIG. 2: picture of liquefied vital wheat gluten, according to one embodiment of the present invention

DETAILED DESCRIPTION

It has been surprisingly found that an adequate liquefaction, wherein the protein material is substantially and progressively liquefied to form a homogeneous and liquefied product, followed by a controlled incubation, allows producing hydrolysed cereal proteins having a similar degree of hydrolysis. The liquefaction preferably does not make use of back mixing and the time necessary for liquefaction is significantly reduced compared to existing processes. It has surprisingly been found that splitting the liquefaction process in several subsequent steps, each step making the following step easier, allows a more efficient liquefaction.

The present invention preferably relates to protein material having visco-elastic properties and forming lumps when hydrated, such as vital wheat gluten.

In the present invention, the liquefaction is preferably conducted in continuous plug flow, in order to have a similar liquefaction time for all incoming proteins. Contrary to existing processes, the liquefaction of the present invention is based on a first in first out principle, is much more efficient and is much faster.

In a first aspect, the present invention relates to a process for liquefying cereal proteins. This liquefaction process comprises the steps of:
  a) Providing a composition comprising one or more cereal protein, said composition having a dry substance of from 5 to 40% by weight of the composition; then
  b) Adding one or more hydrolytic enzymes and/or processing aids to the composition; then
  c) Optionally pre-conditioning the composition; then
  d) Homogenizing the composition.

The duration of the liquefaction process is typically from 5 to 60 minutes. Preferably, the duration of the liquefaction process is from 5 to 50 minutes, even more preferably from 5 to 40 minutes, even more preferably from 5 to 30 minutes, even more preferably from 5 to 20 minutes, even more preferably from 5 to 10 minutes.

In step a), a composition comprising one or more cereal protein is provided.

The composition has a dry substance of from 5 to 40% by weight of the composition (w/w %), preferably from 15 to 38 w/w %, more preferably of from 25 to 35 w/w %, even more preferably of from 28 to 32 w/w %.

The composition comprises from 60 to 95 w/w % water. Preferably the water is plain city water.

Preferably, the dry substance of the composition contains at least 40% protein, preferably at least 50%, more preferably at least 60%, even more preferably at least 70% and most preferably at least 80% protein.

In a preferred embodiment, the composition has to be in the form of one or more visco-elastic lumps. More preferably, part or all protein of the composition has visco-elastic properties and form visco-elastic lumps when hydrated. In the most preferred embodiment, the composition is aqueous vital wheat gluten lumps coming out of a conventional wheat starch-gluten separation process.

The cereal protein used for the purpose of the present invention can be any cereal protein such as derived from wheat, barley, rye, oats, maize, rice, spelt, millet, sorghum and triticale and mixtures thereof. Preferably, the cereal protein is gluten. Gluten can be vital gluten or devitalized gluten. Vital gluten can be in dry form or fresh vital gluten coming out of a conventional starch-gluten separation process. Preferably, the cereal protein is vital wheat gluten coming out of a conventional wheat starch-gluten separation process.

Gluten can be obtained from the cereal via any process known in the art to separate cereal gluten. In a preferred embodiment, the gluten is vital wheat gluten coming out of a conventional wheat starch-gluten separation process.

However, even though it is preferred to start from gluten which has been separated from the other cereal components as is done for wheat in a conventional wheat starch-gluten separation process, gluten separation is not necessary for the purpose of the present invention and the composition of the present invention can be for example hydrated cereal flour comprising gluten. Moreover, flours with different amounts of gluten can be used. In such case, the gluten will be liquefied from the flour. Gluten can then be recovered by any technique known in the art. Additionally, this liquefied composition can be used in the process of the second aspect of the present invention.

In step b), one or more hydrolytic enzymes and/or one or more processing aids are added to the composition comprising one or more cereal protein.

The hydrolytic enzymes which can be used in this invention are generally peptidases also known as proteases. The peptidases are selected from the group consisting of α-amino-acyl-peptide hydrolases (EC 3.4.1.), peptidyl-aminoacid hydrolases (EC 3.4.2.), dipeptide hydrolases (EC 3.4.3.), peptidyl peptide hydrolases (EC 3.4.4.), aminopeptidases (EC 3.4.11.), peptidylamino-acid hydrolases (EC 3.4.12.), dipeptidases (EC 3.4.13.), dipeptidyl-peptidases and tripeptidyl-peptidases (EC 3.4.14.), peptidyl-dipeptidases (EC 3.4.15.), serine-type carboxypeptidases (EC 3.4.16.), metallocarboxypeptidases (EC 3.4.17.), cysteine-type carboxypeptidases (EC 3.4.18.), omega peptidases (EC 3.4.19.), serine endopeptidases (EC 3.4.21.), cysteine endopeptidases (EC 3.4.22.), aspartic endopeptidases (EC 3.4.23.), metalloendopeptidases (EC 3.4.24.), threonine endopeptidases (EC 3.4.25.) Also alkaline peptidases are a suitable class of enzymes for use in this process.

Peptidases are categorized into two subclasses being the subclass of exopeptidases and the subclass of endopeptidases. Preferably, enzymes useful for the purpose of this invention originate from bacterial, animal or plant origin. They include recombinant enzymes, which are for example obtained by genetic engineering techniques.

The process is preferably conducted using at least endo protease activity, however a protease having both endo and exo protease activities may also be used. Alternatively, a mixture of endoproteases, exoproteases and endo- and exo-proteases may be used.

Enzymes that may be used in the process of the present invention include bacterial proteinase from *Bacillus Subtilisis*, acid endo-protease and exo-peptidase from *Aspergillus Niger*, thermo-tolerant bacterial proteinase, neutral thermo-tolerant protease from *Bacillus stearothermophyllus*, papain, neutral bacterial proteinase or endoprotease from *Bacillus species*, neutral bacterial protease from *Bacillus amyloliquefaciens*, alkaline proteinase (fungal, bacterial), endo-proteinase (serine-type; Subtilisin A, *Bacillus licheniformis*), complex endo-protease & exo-peptidase from *Aspergillus otyzae*), bacterial metallo-protease from *Bacillus amyloliquefaciens*.

Because the protein source may contain carbohydrate materials, preferably the composition is also additioned with one or more carbohydrase. Suitable enzymes include for example α or β amylases, pullulanases, cellulases, pentosanases.

It is also possible to add one or more processing aids to the composition comprising one or more cereal protein. The processing aids suitable for the purpose of the present invention are reducing agents, chosen from the group consisting of cysteine, glutathione, bisulfite, sulfite, ascorbic acid, salts thereof and combinations thereof. Typically, processing aids are added in an amount of from 0.001% to 5%

(based on the dry weight of the composition). One example of a suitable processing aid is sodium bisulfite, added at a dosage of for example 0.06% (based on the dry weight of the composition). Processing aids are added in order to weaken the composition by impacting the conformation of the proteins and their physic-chemical properties. This can be particularly useful when the cereal protein is vital wheat gluten. In vital wheat gluten, for example the disulfide bonds (S—S) between different gluten molecules are reduced to sulfhydryl groups (—SH) by the action of the processing aids.

In another embodiment, both enzymes and processing aids can be added to the composition comprising one or more protein. Nevertheless, it is preferable not to add the enzymes and processing aids at the same time but to add them sequentially to the composition to prevent that the enzymes are deactivated by the processing aids.

In step c), the composition may be pre-conditioned. It may be done in order to lower the viscosity of the composition, thereby facilitating the subsequent homogenization step, by lowering the energy this step would require. This is called weakening of the composition. The pre-conditioning may also be done in order to adjust the end product specifications, in particular to adjust the pH. The pre-conditioning may further also be done to adjust the reaction conditions to the optimal working conditions of the enzymes.

The pre-conditioning may comprise one or a combination of two or more of the following treatments:
  Heating the composition
  Mixing the composition
  Adjusting the pH of the composition
  Adding processing aids to the composition, These treatments may be done simultaneously or in subsequent steps. Heating and mixing can conveniently be done simultaneously.

Heating of the composition may be achieved with any type of suitable heating technique known in the art. Preferably, the heating will be done via indirect heating using a static heater. When the heating is combined with mixing, it can be done conveniently using a static heater-mixer. The static heater and the static heater-mixer are suitable for heating materials having from very low viscosity to very high viscosity. The heating medium used can be any suitable heating medium but is preferably water. The temperature of the heating medium is such that the temperature of the composition after heating is from 40 to 55° C., preferably from 45 to 52° C., more preferably 50° C. Heating is not necessary when the composition already has a temperature of minimum 40° C. prior to step c). In a preferred embodiment, where the cereal protein is vital wheat gluten, heating does not reach a temperature of 55° C. From 55° C. on, the structure of vital wheat gluten can be damaged.

Mixing can be achieved using a static mixer type of equipment. As described above, mixing can be done simultaneously with heating, using a static heater-mixer. A static mixer is a device for mixing two (or more) fluid materials. The device consists of one or more non-moving mixer elements contained in a housing. The housing can be for example cylindrical or squared. The non-moving mixer elements are a series of baffles. As the two (or more) fluid materials move through the static mixer, the non-moving elements continuously blend the materials. Any other suitable type of mixing equipment may also be used, such as for example a die-system. This mixing step is only needed to lower the energy needed in the subsequent homogenization step and to make this homogenization step as efficient as possible. In a preferred embodiment, where the cereal protein is vital wheat gluten, the preconditioning comprises mixing prior to the homogenization. Mixing is preferably done using a static mixer. For example, a static mixer type Sulzer SMX TM plus DN 80 with: 3 mixing elements SMX DN 50, 7 mixing elements SMX DN 65, 10 mixing elements SMX plus DN 80 can be used.

The adjustment of the pH can be necessary for providing the optimal working conditions for the enzymes. Depending on the enzyme or enzyme mixture used, the person skilled in the art will easily know which pH needs to be reached.

Also the pH of the end product can be influenced by this adjustment step. Depending on the application wherein the end product will be used, the skilled person will easily determine which pH is needed.

The adjustment of the pH is done with any suitable technique known in the art. Preferably, the pH of the composition will be adjusted by addition of an aqueous solution containing HCl or NaOH, but may, in addition or alternatively, be adjusted by addition of solutions containing acids including but not limited to citric acid, phosphoric acid, acetic acid, sulphuric acid and nitric acid, hydroxides of alkali metals and alkaline earth metals including but not limited to NaOH, KOH and $Ca(OH)_2$ and combinations thereof. The person skilled in the art will know which quantities to add in order to obtain the desired pH.

Processing aids, as described hereinbefore, may be added during the optional pre-conditioning step c).

The person skilled in the art will easily be able to determine whether the pre-conditioning is needed depending on the quality of the composition, on the desired end product specifications and/or on the optimal reaction conditions of the enzymes.

In the most preferred embodiment, the cereal protein is vital wheat gluten coming out of a conventional wheat starch-gluten separation process. Mostly the gluten is then in the form of aqueous lumps. The liquefaction process comprises the steps of:
  a) Providing a composition comprising vital wheat gluten, said composition having a dry substance of from 5 to 40% by weight of the composition; then
  b) Adding one or more hydrolytic enzymes; then
  c) Pre-conditioning the composition; then
  d) Homogenizing the composition.

Wherein the pre-conditioning is heating to a temperature of from 45° C. to 52° C. and mixing with a static mixer.

In step d) of the process, the composition is homogenized. Before entering step d), the composition is composed of at least two major phases: hydrated protein material and free liquid, typically water. Free water is present because the protein material does not naturally and substantially dissolve in the water phase. This is particularly true for vital wheat gluten. Homogenization results in the dispersion of one phase or ingredient (in this case the protein material) into the main continuous phase (in this case water), with which it would normally be immiscible. After homogenization, the composition exists of one single phase, no more lumps are present and it can be poured easily as a continuous stream (like a slurry, milk or water, in contrast to a composition containing lumps).

In a preferred embodiment, the homogenization is achieved with dynamic mixing. Dynamic mixing may be accomplished with any type of suitable equipment having at least one rotor operated at a tip speed of from 1 m/s to 100 m/s, preferably of from 5 m/s to 15 m/s. Suitable equipment used for this purpose includes high shear mixers, centrifugal pump, blenders, colloid type mill. However, the preferred equipment used for the purpose of the present invention is a high shear mixer.

High shear mixers use a rotating impeller or high speed rotor, or a series of such impellers or inline rotors, usually powered by an electric motor, to create flow and shear. The velocity of the fluid at the outside diameter of the rotor will be higher than the velocity at the centre of the rotor, and this creates shear. A stationary component may be used in combination with the rotor and is referred to as the stator. The high shear mixer may be a batch high shear mixer or an inline high shear mixer. Preferably an inline high shear mixer is used. Most preferably, an inline high shear mixer having a rectangular design, creating extra turbulence, is used. In an inline high shear rotor-stator mixer, the rotor-stator array is contained in a housing with an inlet at one end and an outlet at the other. Inline high shear mixers offer a more controlled mixing environment, take up less space, and can be used as part of a continuous process.

All the steps of the liquefaction process may be conducted in batch, in continuous or in continuous plug flow. Preferably, the liquefaction process is conducted in continuous plug flow. In a continuous plug flow design, the reactor typically has the shape of a pipe, a column. The product continuously enters the reactor at one end and continuously leaves the reactor at the other end. All material coming in the process will undergo the same treatments during a similar period of time and the process is based on a first in first out principle. Following a first in first out principle means that the proteins coming first in the process will leave as first the process, such that all proteins have a similar treatment time. Therefore, the product leaving the liquefaction process of the present invention is liquefied and homogeneous: no more lumps are present. The liquefaction process is particularly suited for liquefying compositions comprising visco-elastic lumps. In existing processes, lump formation is avoided. Contrary to existing processes, the process of the present invention does not need to avoid lump formation.

The second aspect of the present invention relates to a process for making hydrolysed cereal proteins. This hydrolysis process allows making a hydrolysate with a narrow distribution of degree of hydrolysis. Also it has been surprisingly found that the process of the second aspect of the present invention produces hydrolysed cereal protein having an excellent digestibility.

The hydrolysis process of the present invention comprises the steps of:
  i) Liquefying a composition comprising one or more cereal protein according to the liquefaction process as described hereinbefore; then
  ii) Optionally pre-treating the composition; then
  iii) Incubating the composition at a temperature of from 50 to 85° C. for a period of at least 5 minutes.

In step ii), the liquefied composition may be pre-treated. The pre-treatment comprises heating the liquefied composition to a temperature of from 50° to 85°, preferably from 65° C. to 75° C. and even more preferably from 68° C. to 72° C. The heating time is 15 minutes or less, preferably 10 minutes or less, preferably 5 minutes or less and preferably 3 minutes or less.

The heating can be done using any suitable technique known in the art. In a preferred embodiment, the heating is done with direct steam injection. Steam is directly injected into the liquefied composition and the steam is such that the desired temperature is reached while the one or more cereal protein of the composition are not denatured and the enzymes, if any are present, are not deactivated. The steam can be at a temperature of from 100° C. to 200° C., 120° C. to 190° C., 150° C. to 180° C. It has been surprisingly found that heating with direct steam injection can considerably reduce the microbiological contamination of the liquefied composition. Also, it has been surprisingly found that the digestibility of the hydrolysate is excellent.

The pre-treatment may also comprise the addition of one or more hydrolytic enzymes to the composition. As described in the liquefaction process of the present invention, the addition of enzymes during liquefaction is not a requirement (provided that processing aids are added). In the case no enzymes were added during liquefaction, enzymes can be added during the pre-treatment step ii). The same enzymes as described in the liquefaction process can be used.

In step iii), the liquefied composition is incubated at a temperature of from 50° C. to 85° C. Preferably, the incubation temperature is from 55° C. to 75° C., even more preferably from 65° C. to 75° C. and most preferably from 68° C. to 72° C. The incubation time is determined by the skilled person in the art, but it is at least 5 minutes. The duration of the incubation is determined by the skilled person as it depends on the type of enzymes used, the enzyme dosage, on the quality of the starting material and should be conducted until the desired Degree of Hydrolysis (DH) is obtained. The desired DH depends on the application wherein the hydrolysed wheat protein is intended to be used. The DH of a protein is defined as the percentage of peptide bonds cleaved. Hydrolysed proteins and in particular enzymatically hydrolysed proteins possess functional properties, such as low viscosity, increased whipping ability, foaming and high solubility, which make them advantageous for use in many applications, in particular food and feed applications. The DH is also correlated to the organoleptic properties of the protein hydrolysates. The DH of the final product can be determined by the OPA method (Shmidt, D. G., Tobben, A. J. P. M., *VMT,* 19, 13-15, 1993).

The liquefaction part and the optional pre-treatment of the hydrolysis process are preferably conducted in continuous plug flow (steps i) and ii)).

Step iii) (the incubation) can be conducted in batch, semi-batch, continuous, continuous plug flow. However, the incubation part of the hydrolysis process is preferably conducted in continuous with multiple reactors or in continuous plug flow. This impacts the residence time and the variability of the residence time of the proteins in the incubator. For the purpose of the present invention, the principle underlying each design is that the incubation will tend as much as possible to a first in first out incubation. Following a first in first out principle means that the proteins coming first into the incubator will leave as first the incubator, such that all proteins have a similar residence time in the incubator. The better the first in first out principle is applied, the less variability there is in the incubation residence time of the proteins, resulting in a hydrolysate having a narrower distribution of degree of hydrolysis.

A batch design is a design where a defined quantity of product enters one reactor (incubator in this case), the product input is stopped and the product in the reactor is incubated for a certain period of time.

A semi batch design is a batch design which is split over multiple reactors. The product input is not stopped but supplied to several reactors which are filled one after the other. Preferably the several reactors have the same design (volume, shape, residence time, heating ability). Once a reactor is filled, the product is incubated for a certain period of time. An infinite number of reactors will lead to a continuous plug flow design. An example of a semi batch design is a set of merry-go-round reactors.

A continuous reactor design with one reactor is a design wherein the product is continuously supplied to the reactor and product is continuously leaving the reactor. A continuous reactor design with multiple reactors is a continuous reactor design, split over multiple reactors. An infinite number of reactors will lead to a continuous plug flow design. An example of such a design is a cascade tank system.

A continuous plug flow design is a design where the product continuously enters at one end and continuously leaves at the other end of the reactor. Typically the reactor has the shape of a pipe, a column.

The process of the present invention will be explained for the most preferred embodiment, wherein the cereal protein is vital wheat gluten. In this case, the hydrolysis process of the present invention will typically be as follows:
1. Providing a composition comprising vital wheat gluten, said composition having a dry substance of from 5 to 40% by weight of the composition; then
2. Adding one or more hydrolytic enzymes and/or processing aids to the composition; then
3. Pre-conditioning the composition; then
4. Homogenizing the composition; then
5. Pre-treating the composition obtained in step 4; then
6. Incubating the composition at a temperature of from 50 to 85° C. for a period of at least 5 minutes The hydrolysate, obtained after incubation can be further purified to recover the hydrolysed proteins. The hydrolysate can for example be submitted to a fibre separation step and/or to a concentration step and/or to an enzyme deactivation step and/or to a drying step in order to obtain a protein concentrate in the form of a powder or paste for example.

Fibre separation can be done by any method known in the art. For example, fibre separation can conveniently be done by decantation.

Concentration can be done using any method known in the art. Generally, concentration may be conducted by using any type of evaporator such as a forced circulation evaporator, a falling film evaporator, a rising film evaporator, a scraped surface evaporator, plate evaporator and any other type of suitable evaporators.

Enzyme deactivation may be done by any suitable technique known in the art, such as heating to a temperature sufficient to deactivate the enzyme.

Drying may be conducted with any suitable type of dryer such as a spray dryer, flash dryer, ring dryer, roll dryer, fluidized bed dryer or any other type of suitable dryers. Drying typically results in a product having a moisture content of 10% by weight or less.

A third aspect of the present invention relates to a hydrolysed cereal protein obtainable by the hydrolysis process of the present invention. It can be characterized by its viscosity or its sedimentation profile for example.

A fourth aspect of the present invention relates to a food or feed composition comprising the hydrolysed cereal protein obtainable by the hydrolysis process of the present invention. The composition can further comprise ingredients such as carbohydrates, fats, minerals vitamins, oligoelements and the like. The composition of the present invention may be a powder, a paste or a liquid. The composition can be in different forms such as powder, paste, liquid. The composition of the present invention may be compressed to form a pellet.

In one embodiment, the composition of the present invention is pressed in the form of a pellet.

A fifth aspect of the present invention relates to the use of the composition of the present invention in food and feed applications. The composition can be used as protein supplement or as partial or total replacement of animal protein in food and feed formulations.

In one embodiment, the composition can be used to replace part or all of the milkproteins of calf milk replacer formulations. Calf milk replacer formulations are formulations used to feed calves during their liquid feeding period. The hydrolysed protein of the present invention have excellent digestibility and are suitable to remain in suspension in particular at about 40° C. for an adequate period of time during the ingestion of the calf milk replacer.

In another embodiment, the composition is used as protein source in fish feed. Fish feed composition typically contain proteins, oil, binders, antioxidants, vitamins and sometimes carbohydrates.

In yet another embodiment, the composition is used in specialty feeds. Those are particularly aimed at young companion animals and young animals raised for commercial purpose, such as piglets; at ill animals or animals recovering from illness, or at elder animals. Those specialty feeds must be highly nutritive and easily digestible. As described in the present invention, the hydrolysis process of the present invention is hydrolysed cereal proteins with excellent digestibility.

The invention will be illustrated by the following examples.

EXAMPLES

Example 1

Continuous Plug Flow Process for Making Hydrolysed Wheat Proteins

Vital wheat gluten was liquefied as follows: Vital wheat gluten (VWG) coming out of a conventional wheat plant was provided (30% dry matter, 37° C. and pH of 5.8). The following enzymes were added in-line:
1. Corolase® 2TS (AB enzymes): 0.022% $w_{enzyme}/w_{dry\ weight\ VWG}$
2. Ban® 480LS (Novozymes): 0.06% $w_{enzyme}/w_{dry\ weight\ VWG}$
3. Rohalase® Sep (AB enzymes): 0.03% $w_{enzyme}/w_{dry\ weight\ VWG}$ The composition of vital wheat gluten and enzymes was supplied at a flow rate of 400 l/h via a 4-stage mono pump to a unit wherein the composition was first heated to 50° C. The heating medium used was water having a temperature of 60° C. The heating was done with a static heater-mixer (SMR DN 150 plus, Serial n° CT-1810). Then the composition was mixed with a static mixer (Sulzer SMX TM plus DN 80 with: 3 mixing elements SMX DN 50, 7 mixing elements SMX DN 65, 10 mixing elements SMX plus DN 80). Then the composition was homogenized with a high shear in-line mixer running at 1500 rpm (Typhoon HSI20 equipped with 2 DT mixing blades, 11 kWatt motor), tip speed being 11 m/s.

The product leaving the continuous plug flow liquefaction was then heated to 71° C. by means of direct steam injection (Hydro Thermal heater M103/03) supplied with steam at maximum 12 bar; then incubated by passing through an insulated holding coil (DN 250, 22.5 m length), resulting in an incubation time of approximately 3 hours.

A sample of the incubated product was freeze dried and analysed:

Degree of Hydrolysis: 4.8% on db
Protein digestibility: 99.2%
Sedimentation: 170/200 at pH 6.2

Methods of Analysis of Hydrolysed Proteins

Degree of hydrolysis: OPA method (Shmidt, D. G., Tobben, A. J. P. M., VMT. 19, 13-15, 1993)

Protein digestibility: according to the in vitro digestibility test as described by Dierick and Hendrickx (1990).

Sedimentation: 12 g wet product (30% w/w dry substance)+188 g demineralised water at 45° C. in a 500 ml beaker were stirred with a magnetic stirrer until all product is in suspension. pH is adjusted to 6.2 with 0.1N NaOH. The beaker is placed without stirring in a water bath (water temperature 40° C.) till the suspension has a temperature of 40° C. The suspension taken out of the bath and shaken and is brought into an Imhoff cone. The level of the suspension/water split is read after 2 minutes.

Example 2

Continuous Plug Flow Process for Making Hydrolysed Wheat Proteins

Vital wheat gluten coming out of a conventional wheat plant was provided (30% dry matter, 38° C. and pH of 5.7). The same enzymes and enzymes dosage as in Example 1 were added. The same liquefying conditions as in Example 1 were applied to the composition of gluten and enzymes.

The product leaving the continuous plug flow liquefaction was heated to 71° C. by means of direct steam injection (Hydro Thermal heater M103/03) supplied with steam at maximum 12 bar; and was collected during 1 hour in a stirred vessel of 700 l and incubated during 3 hours while being kept at 70° C.

A first sample (A) was taken after 2 hours of incubation and a second sample (B) after 3 hours of incubation. The samples were freeze dried and analysed:

| Sample | Degree of Hydrolysis (%) | Sedimentation |
|--------|--------------------------|---------------|
| A      | 4.9                      | 170/200       |
| B      | 5.2                      | 180/200       |

Example 3

Process for Making Hydrolysed Wheat Proteins

Vital wheat gluten coming out of a conventional wheat plant was provided (30% dry matter, 37° C. and pH 5.5). Sodium bisulfite (Sigma-Aldrich, Cat 24, 397-3) was added in-line 0.06% $w_{Sodium\ bisulfite}/w_{dry\ weight\ VWG}$. Sodium bisulfite was for the convenience diluted in a 10% water solution.

The composition of vital wheat gluten and additive was supplied via a 4-stage mono pump at a flow rate of 400 l/h to a unit wherein the composition was preheated from 37° C. to 47° C. by means of water at 57° C. as heating medium. The heating was done with a static heater/mixer (Sulzer SMR DN 150 plus, Serial no. CT-1810). Then the composition was mixed with a static mixer (Sulzer SMX TM plus DN 80 with: 3 mixing elements SMX DN 50, 7 mixing elements SMX DN 65, 10 mixing elements SMX plus DN 80). Then the composition was homogenized with a high shear in-line mixer running at 1500 rpm (Typhoon TM HSI20 equipped with 2 DT mixing blades, 11 kWatt motor), the tip speed being 11 m/s.

The product coming out of the continuous plug flow liquefaction unit was heated to maintain a temperature in the range of 45° C. to 50° C. by means of direct steam injection (Hydro Thermal heater M103/03) supplied with steam at maximum 12 bar; and collected during 30 minutes in a stirred vessel of 700 l. 10 minutes after collecting the product, the following enzymes were added:

1. Corolase® 2TS (AB enzymes): 0.026% $w_{enzyme}/w_{dry\ weight\ VWG}$
2. Ban® 480LS (Novozymes): 0.07% $w_{enzyme}/w_{dry\ weight\ VWG}$
3. Rohalase® Sep (AB enzymes): 0.035% $w_{enzyme}/w_{dry\ weight\ VWG}$ After 10 minutes stirring, a 2 liter sample was taken out of the tank for incubation on lab-scale in a stirred vessel at 70° C.

A sample of the incubated product was freeze dried and analysed:

Degree of hydrolysis after 2 hours incubation: 5.6%
Degree of hydrolysis after 3 hours incubation: 6.6%

The invention claimed is:

1. A process for liquefying one or more cereal proteins, the process comprising:
   a) providing a viscoelastic composition comprising one or more cereal proteins, the composition having a dry substance of from 15 to 40% by weight of the composition;
   b) adding one or more hydrolytic enzymes and/or processing aids to the composition;
   c) pre-conditioning the composition; and
   d) homogenizing the composition,
   wherein the process is a continuous plug flow process.

2. The process of claim 1, wherein the homogenization comprises dynamic mixing with equipment having at least one rotor operating at a tip speed of from 1 m/s to 100 m/s.

3. The process of claim 1, wherein the homogenization comprises dynamic mixing with equipment having at least one rotor operating at a tip speed of from 5 m/s to 20 m/s.

4. The process of claim 1, wherein the cereal protein is vital wheat gluten.

5. The process of claim 1, wherein pre-conditioning comprises mixing, heating, addition of processing aids, adjustment of pH, and combinations thereof.

6. The process of claim 1, wherein pre-conditioning comprises mixing, heating, addition of processing aids, adjustment of pH, and combinations thereof and wherein the composition is heated to a temperature of from 40° C. to 55° C.

7. The process of claim 1, wherein the processing aids are selected from the group consisting of cysteine, gluthatione, bisulfate, sulfite, ascorbic acid, salts thereof, and combinations thereof.

8. The process of claim 1, wherein the viscoelastic composition has a dry substance of from 25 to 40% by weight of the composition.

9. The process of claim 1, wherein the process produces a hydrolysed cereal protein having a degree of hydrolysis of at least 4.8%.

10. A process for making hydrolysed cereal protein, the process comprising:
    a) providing a viscoelastic composition comprising one or more cereal proteins, the composition having a dry substance of from 15 to 40% by weight of the composition;

b) adding one or more hydrolytic enzymes and/or processing aids to the composition;
c) homogenizing the composition; and
d) incubating the composition at a temperature from 50° C. to 85° C. for a period of at least 5 minutes, wherein the process is a continuous plug flow process.

11. The process of claim 10, wherein the pre-treatment step comprises heating the composition to a temperature from 50° C. to 85° C. in 15 minutes or less.

12. The process of to claim 11, wherein the heating of the pre-treatment step is achieved with direct steam injection.

13. The process of claim 10, further comprising pre-conditioning the composition before incubating the composition.

14. The process of claim 10, further comprising pre-treating the composition before incubating the composition.

15. The process of claim 10, wherein the viscoelastic composition has a dry substance of from 25 to 40% by weight of the composition.

16. The process of claim 10, wherein the process produces a hydrolysed cereal protein having a degree of hydrolysis of at least 4.8%.

\* \* \* \* \*

UNITED STATES PATENT AND TRADEMARK OFFICE
CERTIFICATE OF CORRECTION

PATENT NO. : 9,655,375 B2
APPLICATION NO. : 13/991753
DATED : May 23, 2017
INVENTOR(S) : Walter Josephina Leo Bux et al.

It is certified that error appears in the above-identified patent and that said Letters Patent is hereby corrected as shown below:

In the Claims

In Column 13, Line 10, in Claim 12, after "The process of" delete "to".

Signed and Sealed this
Fifth Day of September, 2017

Joseph Matal
*Performing the Functions and Duties of the*
*Under Secretary of Commerce for Intellectual Property and*
*Director of the United States Patent and Trademark Office*